Sept. 24, 1957     L. J. EVANS     2,807,274
POWER TRANSMISSION
Filed March 21, 1955
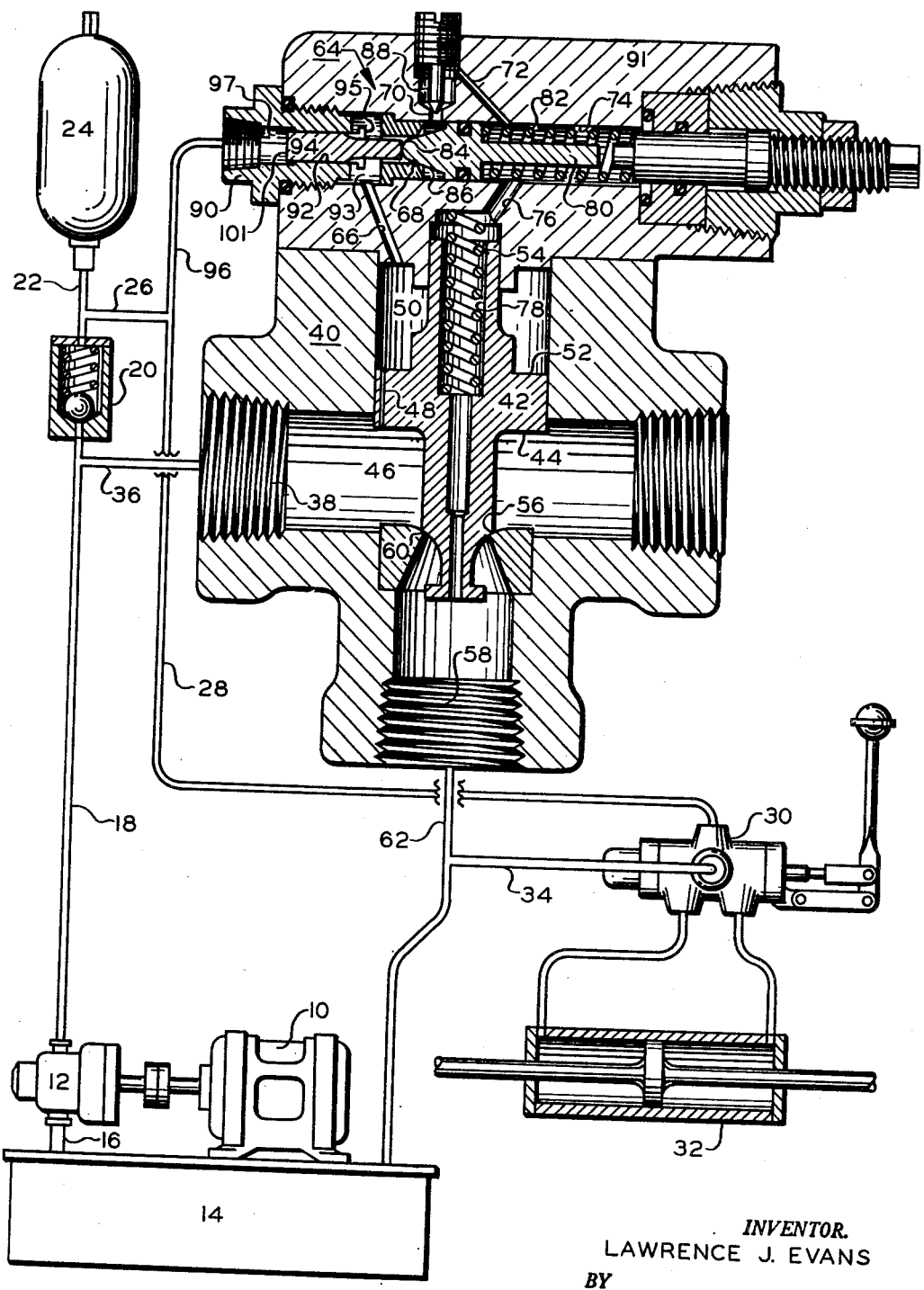
INVENTOR.
LAWRENCE J. EVANS
BY
*Ralph L. Tweedle*
ATTORNEY United States Patent Office 2,807,274
Patented Sept. 24, 1957

2,807,274

POWER TRANSMISSION

Lawrence J. Evans, Detroit, Mich., assignor to Vickers Incorporated, Detroit, Mich., a corporation of Michigan Application March 21, 1955, Serial No. 495,514

4 Claims. (Cl. 137—108)

This invention relates to power transmissions, and is particularly applicable to those of the type comprising two or more fluid pressure energy translating devices, one of which may function as a pump and another as a fluid motor.

More particularly the invention relates to an improved pump unloading mechanism for use in such a transmission.

In many power transmissions a fluid motor is only intermittently operated. To conserve power it is desirable that the pump be unloaded during periods of motor non-use. Since the motor must usually be instantly available for work, such circuits ordinarily include an accumulator for storing fluid under pressure. An unloading valve is provided which diverts the pump discharge back to the reservoir at lower pressure whenever the accumulator is adequately charged.

Many prior unloading valves have been subject to erratic operation and have had a tendency to hang up; that is, under certain conditions they fail to completely unload the pump even though the accumulator may be fully charged.

It is an object of this invention to provide an improved unloading valve for such a transmission.

More particularly it is an object of this invention to provide a low cost unloading valve which is sensitive and dependable and in which the hanging up tendency is minimized.

Various circuits often require various operating differentials, that is, the pressure difference between pump unloading and loading. For example, in a particular application it might be desirable to charge the accumulator to 1000 p. s. i. and then unload the pump until accumulator pressure drops to 900 p. s. i. In another circuit it might be required that accumulator pressure drop to 750 before the pump is reloaded. Conventional unloading valves usually provide a preselected differential. The components of those valves are so proportioned as to give that particular differential. To vary the differential it is often necessary to actually dismantle the valve and change certain components. This is an inefficient and costly arrangement, not only from a labor standpoint but also because of the large number of parts which must be stocked to provide the various desired operating differentials.

It is therefore an object of this invention to provide a low cost unloading valve having an easily adjustable operating differential.

It is a further object to provide such a valve in which the operating differential may be easily and quickly adjusted from the valve exterior and without changing any of the valve components.

Another object is to provide such a valve in which both the initial unloading pressure and operating differential may be independently and easily adjusted.

Further objects and advantages of the present invention will be apparent from the following description, reference being had to the accompanying drawing wherein a preferred form of the present invention is clearly shown.

In the drawing:

The single figure illustrates a power transmission incorporating the present invention.

Referring now to the drawing there is shown a prime mover 10 driving a pump 12. Pump 12 draws fluid from a reservoir 14 through an inlet conduit 16, and discharges fluid under pressure to a utilization circuit which includes a delivery conduit 18 having a non-return valve 20 of the spring biased check type therein. From a point downstream of check valve 20 a branch conduit 22 extends to an accumulator 24. A second branch 26 communicates with a downwardly extending conduit 28 which leads to a 4-way valve 30. Valve 30 is connected to control an intermittently operated fluid motor 32. A return line 34 from the valve 30 leads to the reservoir 14.

A conduit 36 extends from the utilization circuit at a point upstream of non-return valve 20 to communicate with the inlet port 38 of an unloading valve, generally designated 40. Unloading valve 40 includes a main by-pass valve 42 of the balanced piston type. Piston 42 has a first effective area 44 which is exposed directly to the pump operating pressure existing in the chamber 46. A small drilled passage 48 extends through the piston 42 to establish restricted communication with a control chamber 50. Spool 42 has an effective area 52 exposed to pressure in control chamber 50. Areas 44 and 52 are substantially equal. When there is no flow out of the control chamber 50, pressure forces on valve spool 42 are substantially equal. A light spring 54 biases spool 42 to the position shown. A valve seat 56 is provided between the chamber 46 and the by-pass port 58. The valving portion 60 on spool 42 normally closes communication between the chamber 46 and the by-pass port 58. Conduit means 62 extend from port 58 to the reservoir 14.

Spool 42 is actuated by vent control mechanism generally designated 64. Mechanism 64 controls fluid flow in a venting passage which includes a drilled passage 66, valve seat 68, passages 70 and 72, the spring chamber 74, passage 76, and the central bore 78 in spool 42.

A control valve 80 is adjustably biased by a spring 82 against the seat 68. The nose of valve 80 forms a first effective area 84 which in the closed position is exposed to pressure in the venting passage upstream from the valve seat 68. The pressure at which pump unloading is initiated may be adjusted by varying the load of spring 82. An additional area 86 is provided on valve 80 which area is exposed to pressure upstream from passage 70. A restriction valve 88 of the needle type is located in passage 70 and provides an adjustable resistance to flow in the venting passage to permit adjustment of the operating differential in a manner to be hereinafter described.

A fitting 90 is threaded into the cap 91 of valve 40 and contains a bore 92 which opens into a chamber 93 in the venting passage. Bore 92 coaxially aligns with the control valve 80 and has an imperforate plunger 94 therein which is in fluid sealing engagement therewith. A branch conduit 96 extends from conduit 26 to communicate with the accumulator pressure chamber 97 at the outer end of bore 92. Plunger 94 thus has pressure in chamber 93 imposed on its inner end area 95 and pressure downstream from non-return valve 20 imposed on its equal and opposed outer end area 101.

The effective area 84, established by the area of seat 68, is so selected as to be somewhat smaller than the end areas of plunger 94, as established by the area of bore 92. However, the combined effective areas 84 and 86 substantially exceed the end area 95 of plunger 94. The ratio between the effective area 84 on valve 80 and end area 101 on plunger 94 influences the pressure differential between loading and unloading of pump 12. This influence is subject to modification by adjustment of needle valve 88 as will be hereinafter seen.

In operation with the accumulator 24 in the discharged condition, the delivery from pump 12 passes over the non-return check valve 20 and to the branched passages 22 and 26 of the utilization circuit. Accumulator pressure is conducted through conduit 96 to act on the outer end area 101 of plunger 94. The fluid pressure of the pump discharge is conducted through conduit 36 to chamber 46 of the unloading valve 40 and through restricted passage 48 to the control chamber 50. Since equal and opposed areas of spool 42 are exposed to pressure in chambers 46 and 50, the spring 54 maintains the valve closed, isolating chamber 46 from the bypass port 58. Pump pressure is conducted from chamber 50 through the passage 66 to chamber 93, where it is imposed on the end area 84 of control valve 80. Pressure in chamber 93 also acts on the inner end area 95 of plunger 94 exerting force thereon in opposition to the accumulator pressure reacting on its outer end. Since, while the accumulator is being charged, these two pressures are substantially equal, plunger 94 exerts no force on valve 80.

As the accumulator pressure increases, pump operating pressure will also rise. When the pump operating pressure in chamber 93 reaches a valve controlled by effective area 84 of control valve 80 and the load of spring 82, valve 80 will crack and thus vent fluid from chamber 93 and chamber 50. Due to the restrictive effect of passage 48, pressure will drop in chambers 93 and 50, thus producing a pressure differential between chambers 46 and 50 and between chambers 97 and 93. The pressure differential between chambers 46 and 50 unbalances valve 42 in a direction such as to tend to connect chamber 46 and bypass port 58.

The pressure differential between chambers 97 and 93 creates a pressure unbalance across plunger 94 such as to cause it to contact valve 80 and to urge it to the fully open position. This action is a self-generating one, with further opening of control valve 80 increasing the pressure differential between chambers 97 and 93 and thus increasing the force exerted on control valve 80 by the plunger 94. Control valve 80 is almost instantaneously carried to its fully opened position by plunger 94, thus establishing the venting path. The main by-pass spool 42 will then assume a flow modulating by-pass position such that only that low pressure is maintained on pump 12 which is required to unbalance spool 42 sufficiently to overcome the light spring 54.

When the discharge pressure of pump 12 drops, due to by-passing action of valve 42 initiated by opening of valve 80, non-return valve 20 will seat and accumulator pressure will be maintained in chamber 97, where it will be exerted against area 101 of plunger 94 to maintain valve 80 in the open position. As heretofore noted, end area 101 of plunger 94 is greater than the effective end area 84 of valve 80. Thus for valve 80 to close and effect re-loading of the pump, pressure in chamber 97 must drop to a lower value than that pressure which, acting in chamber 93, initiated opening movement of valve 80.

When valve 88 is in a non-restricting position, the ratio of unloading pressure to loading pressure, which is the measure of operating differential, is substantially equal to the ratio of area 101 to area 84. This pressure ratio can be easily modified by adjustment of restriction valve 88, however.

To increase the operating differential, valve 88 is adjusted to a flow restrictive position in the venting path. When valve 80 cracks to initiate venting flow, pressure will be built up ahead of valve 88. As heretofore noted, valve 42 modulates during pump unloading to maintain a substantially constant pressure differential between chambers 46 and 50 to overcome spring 54, and hence will maintain a substantially constant flow rate through the restriction 48. Pressure ahead of valve 88 will thus be closely proportional to the restrictive effect of the valve. This pressure is imposed on area 84 and auxiliary area 86 of control valve 80, providing a supplemental force on valve 80 which acts to maintain the valve open. This same pressure is also imposed on area 95 of plunger 94 and acts in opposition to accumulator pressure on area 101. However, since the total effective end area of valve 80 when opened is greater than the end area 95 of plunger 94, the net effect of pressure produced by valve 88 is to aid in maintaining valve 80 open. Increasing the resistance of valve 88 increases the operating differential of the unloading valve. Similarly, decreasing resistance on valve 80 permits lowering of operating differential to the limit established by the ratio of area 101 to effective area 84.

There has thus been provided an improved, low cost, and sensitive pump unloading valve in which both the initial unloading pressure and the operating differential may be independently and easily adjusted.

While the form of embodiment of the invention as herein disclosed constitutes a preferred form, it is to be understood that other forms might be adopted, all coming within the scope of the claims which follow.

What is claimed is as follows:

1. Vent control mechanism for unloading a pump supplying a utilization circuit, comprising: a non-return valve in the utilization circuit; means forming a venting passage communicating with the utilization circuit at a point upstream from the non-return valve; a normally closed pressure responsive control valve in the venting passage and having a first area exposed to pressure therein; plunger means adapted to contact the control valve and urge it toward an open position, said plunger having a first area exposed to pressure in the venting passage and a second, opposed area exposed to pressure in the utilization circuit downstream of the non-return valve, said second area of the plunger being greater than said first area of the control valve; flow restrictive means in the venting passage downstream of the control valve; and an auxiliary area associated with the control valve, said area being exposed to pressure upstream of the flow restrictive means so as to be effective in urging the control valve toward a full open position after initial opening, the sum of said first control valve area and said auxiliary area being greater than the first area of said plunger.

2. Vent control mechanism for unloading a pump supplying a utilization circuit, comprising: a non-return valve in the utilization circuit; means forming a venting passage communicating with the utilization circuit at a point upstream from the non-return valve; a normally closed pressure responsive control valve in the venting passage and having a first area exposed to pressure therein; plunger means adapted to contact the control valve and urge it toward an open position, said plunger having a first area exposed to pressure in the venting passage and a second, opposed area exposed to pressure in the utilization circuit downstream of the non-return valve; adjustable flow restrictive means in the venting passage downstream of the control valve to vary the operating differential; and an auxiliary area associated with the control valve, said area being exposed to pressure upstream of the flow restrictive means so as to be effective in urging the control valve toward a full open position after initial opening.

3. In an unloading valve for a pump supplying a utilization circuit having a non-return valve therein, the combination of: a main by-pass valve of the balanced piston type communicating with the utilization circuit at a point upstream from the non-return valve, having a pair of opposed areas in restricted fluid communication and a control chamber ventable to open the valve; means forming a venting passage communicating with the control chamber; a normally closed pressure responsive control valve in the venting passage and having a first area exposed to pressure therein; plunger means adapted to contact the control valve and urge it toward an open position, said plunger having a first area exposed to pressure in the venting passage and a second, opposed area exposed to pressure in the utilization circuit downstream of the non-return valve; flow restrictive means in the venting passage downstream of the control valve; and an auxiliary area associated with the control valve, said area being exposed to pressure upstream of the flow restrictive means so as to be effective in urging the control valve toward a full open position after initial opening.

4. In an unloading valve for a pump supplying a utilization circuit having a non-return valve therein, the combination of: a main by-pass valve of the balanced piston type communicating with the utilization circuit at a point upstream from the non-return valve, having a pair of opposed areas in restricted fluid communication and a control chamber ventable to open the valve; means forming a venting passage communicating with the control chamber; a normally closed pressure responsive control valve in the venting passage and having a first area exposed to pressure therein; a plunger means adapted to contact the control valve and urge it toward an open position, said plunger having a first area exposed to pressure in the venting passage and a second, opposed area exposed to pressure in the utilization circuit downstream of the non-return valve; adjustable flow restrictive means in the venting passage downstream of the control valve to vary the operating differential; and an auxiliary area associated with the control valve, said area being exposed to pressure upstream of the flow restrictive means so as to be effective in urging the control valve toward a full open position after initial opening.

References Cited in the file of this patent

UNITED STATES PATENTS 2,649,115     Deardorff             Aug. 18, 1953

FOREIGN PATENTS 721,645       Great Britain           Jan. 12, 1955